(12) United States Patent
Bilstein et al.

(10) Patent No.: US 7,338,093 B2
(45) Date of Patent: Mar. 4, 2008

(54) CONNECTION FOR FLUID LINES

(75) Inventors: Rozalia Bilstein, Wipperfürth (DE); Josef Brandt, Wipperfürth (DE); Volker Kaminski, Halver (DE)

(73) Assignee: Voss Automotive GmbH, Wipperfürth (DE)

( * ) Notice: Subject to any disclaimer, the term of this patent is extended or adjusted under 35 U.S.C. 154(b) by 109 days.

(21) Appl. No.: 11/205,573

(22) Filed: Aug. 17, 2005

(65) Prior Publication Data

US 2006/0049630 A1 Mar. 9, 2006

Related U.S. Application Data

(60) Provisional application No. 60/606,937, filed on Sep. 3, 2004.

(51) Int. Cl.
*F16L 37/00* (2006.01)
(52) U.S. Cl. .................. 285/307; 285/314; 285/321; 285/374; 285/403; 285/921
(58) Field of Classification Search .............. 285/307, 285/314, 321, 374
See application file for complete search history.

(56) References Cited

U.S. PATENT DOCUMENTS 2,727,761 A * 12/1955 Elliott et al. .................. 285/83
3,930,674 A    1/1976 Jonsson
4,035,005 A *  7/1977 DeVincent et al. ......... 285/319
4,332,402 A *  6/1982 Shellhause ................... 285/86
4,753,459 A *  6/1988 Potier ..................... 285/148.17
5,540,463 A *  7/1996 Potokar ....................... 285/319
5,653,475 A *  8/1997 Scheyhing et al. ........... 285/54
6,155,607 A * 12/2000 Hewitt et al. ................. 285/81

FOREIGN PATENT DOCUMENTS

DE    4310795        7/1994
EP    0 216 693      9/1986
GB    2227292    *   7/1990

* cited by examiner

*Primary Examiner*—David Bochna
(74) *Attorney, Agent, or Firm*—Brinks Hofer Gilson & Lione

(57) ABSTRACT

The plug type connection of this invention consists of two coupling parts which can be fitted together, to be precise a socket part and a plug part, it being possible for the plug part, with a plug shank, to be inserted in a sealing manner into a locating opening of the socket part and to be releasably locked in the plugged-in state via a locking arrangement, the locking arrangement consisting, on the one hand, of two outer, radial, flange-like retaining webs, axially adjacent in the plug-in direction in the plugged-in state, of the two coupling parts and, on the other hand, of a retaining element which, with at least one retaining section which is C-shaped in axial section, axially and radially encloses the retaining webs of the two coupling parts in a positive-locking manner.

24 Claims, 4 Drawing Sheets

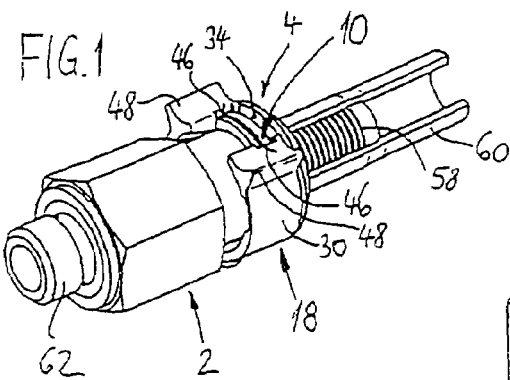
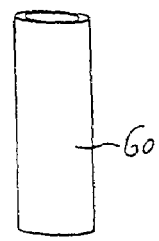
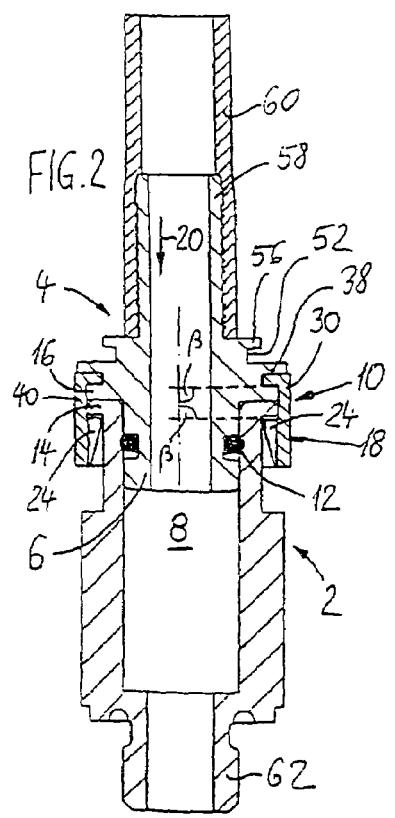
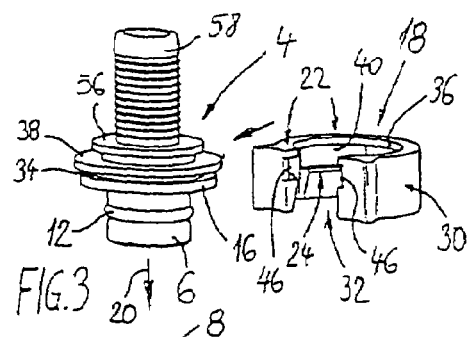
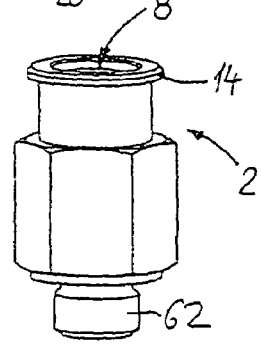

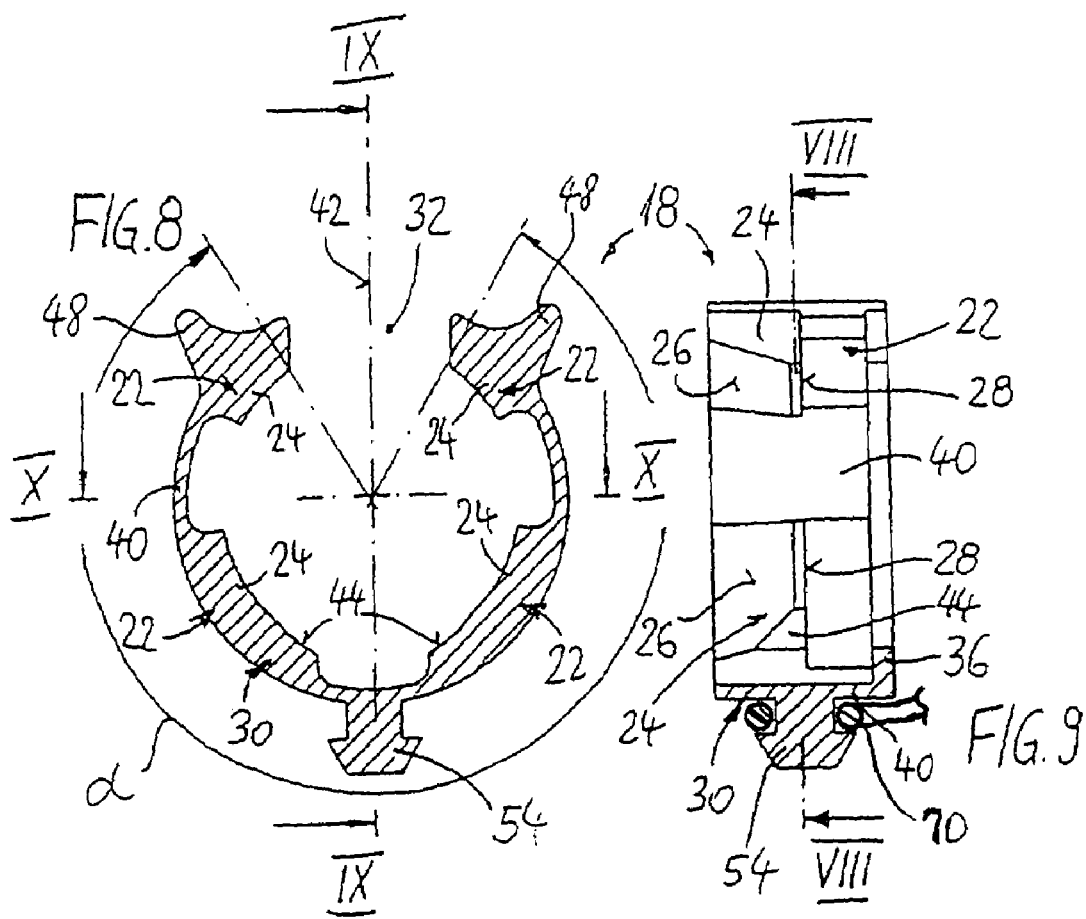
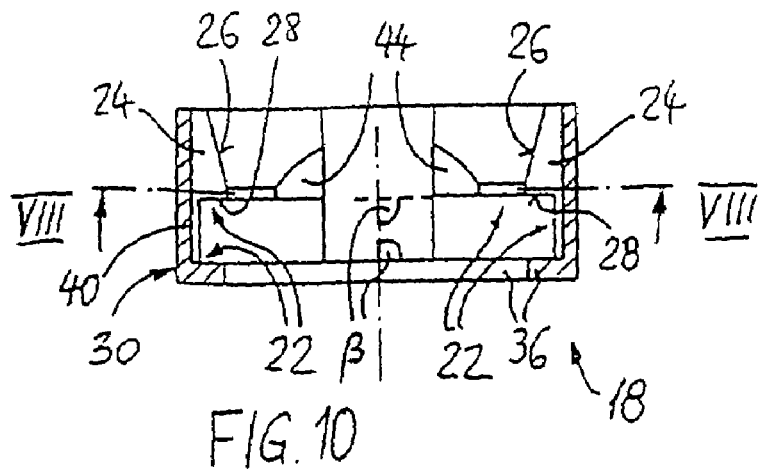

CONNECTION FOR FLUID LINES

CROSS-REFERENCE TO RELATED APPLICATIONS

The present invention claims priority to U.S. Provisional Ser. No. 60/606,937 filed on Sep. 3, 2004 and entitled "Connection For Fluid Lines."

FIELD OF THE INVENTION

The present invention relates to a plug-type connection for fluid lines.

BACKGROUND OF THE INVENTION

In the context of this description, the term "fluid" refers to any desired liquid and/or gaseous flow medium or pressure medium. The plug-type connection of this invention is therefore suitable for both hydraulic, pneumatic and also hydropneumatic applications. However, a preferred field of application of the plug-type connection according to the invention is the connection of fuel lines in motor vehicles.

A plug-type connection of the generic type of this invention is described in DE-A 2 414 828 or corresponding U.S. Pat. No. 3,930,674. In this case, a plug-in and locking principle is provided, according to which both coupling parts each have one of two outer annular flanges which are axially adjacent in the plugged-in state and are locked with a clip-like retaining element. To this end, the retaining element is designed as a partial-ring-shaped, flexible clip which is approximately C-shaped in plan view and has two diametrically opposite end sections which are C-shaped in axial section and axially and radially enclose the flanges of the coupling parts. Such a plug-type connection, at relatively low assembly forces, ensures high release or pulling-off forces and can thus also be used at high operating pressures. However, assembly is rather awkward, since the coupling parts first have to be fitted together and then fixed manually until the clip is separately slipped on radially. This radial fitting of the clip requires a correspondingly large clearance space at the fitting location, for which reason it is not possible to use such a clip, or it is only possible to use it to a limited extent, for example in units having a plurality of plug-type connections at small center distances. In addition, there is a high risk of losing the separate clip in the state in which it is not yet fitted or in the state in which it is subsequently released again. In some applications, it is desirable nowadays to integrate a valve for discharge protection in at least one of the coupling parts. In this case, the fitting location described leads to special problems, since the coupling parts are plugged in against a valve spring force and have to be held against this spring force manually until the clip is slipped on radially. This fitting in any case requires two hands.

The object of the present invention is to improve a plug-type connection of the aforesaid type in such a way that, while retaining the advantages of the known locking principle (in particular high pulling-off forces), while the risk of losing the retaining element is reduced and the fitting is simplified. The plug type connection is especially useful in applications in which there is only a small surrounding space at the fitting location and/or in which at least one valve is to be integrated in the coupling parts.

According to the invention, the objects are achieved in that the retaining element is designed in such a way and is captively pre-fitted or can be captively pre-fitted on one of the two coupling parts in such a way that it is axially fixed with little play and is captively fixed radially and is elastically movable radially in the region of the retaining section. The retaining element, in the region of the retaining section, and the retaining web of the other coupling part being designed so as to be adapted to one another for forming a positive-locking latching connection, acting in the plug-in direction. When the coupling parts are fitted together, the retaining section is moved radially outward by the retaining web, moving relative thereto, and subsequently, in the plugged-in state, by moving back radially inward, encloses the retaining webs of the two coupling parts for the locking connection.

By this configuration according to the invention, the advantages of the known locking principle of the generic type are combined with the advantages of a plug-in latching principle. In the state of the retaining element in which it is pre-fitted on the one coupling part, only the other coupling part needs to be plugged in. Thus simple, quick and comfortable and also very reliable single-hand fitting is possible. The connection of this invention maybe used at fitting locations with a small surrounding space in the radial direction. Furthermore, release of the connection is possible by radial removal of the retaining element.

SUMMARY OF THE INVENTION

The plug type connection of this invention consists of two coupling parts which can be fitted together, especially a socket part and a plug part, it being possible for the plug part, with a plug shank, to be inserted in a sealing manner into a locating opening of the socket part and to be releasably locked in the plugged-in state via a locking arrangement, the locking arrangement consisting, on the one hand, of two outer, radial, flange-like retaining webs, axially adjacent in the plug-in direction in the plugged-in state, of the two coupling parts and, on the other hand, of a retaining element which, with at least one retaining section which is C-shaped in axial section, axially and radially encloses the retaining webs of the two coupling parts in a positive-locking manner.

Further advantageous configuration features of the invention are contained in the subclaims and the description below.

BRIEF DESCRIPTION OF THE DRAWINGS

The invention is to be explained in more detail with reference to a preferred exemplary embodiment illustrated in the drawing, in which:

FIG. 1 shows a perspective view of a plug-type connection according to the invention in the plugged-in and locked state of the coupling parts;

FIG. 2 shows an enlarged axial cross-sectional illustration of the plug-type connection according to FIG. 1;

FIG. 3 shows a perspective exploded illustration of the components of the plug-type connection according to the invention;

FIG. 8 shows an enlarged cross section of the retaining element in the section plane VIII-VIII according to FIG. 9 or FIG. 10;

FIG. 9 shows an axial cross-section of the retaining element in the plane IX-IX according to FIG. 8;

FIG. 10 shows an axial cross-section of the retaining element in the plane X-X according to FIG. 8;

DETAILED DESCRIPTION OF THE INVENTION

Figure 4:
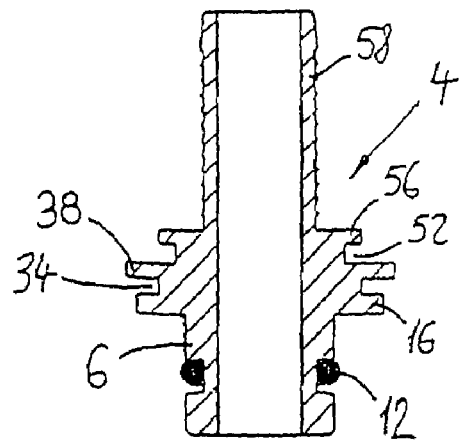
FIG. 4 shows a separate illustration of the one coupling part in axial cross-section view analogous to FIG. 2.
Figure 5:
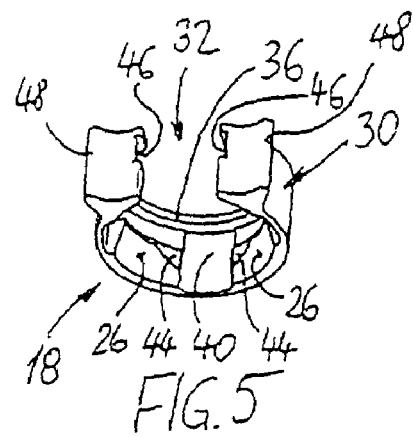
FIG. 5 shows a separate perspective illustration of the retaining element.

In the various figures of the drawing, the same parts are always provided with the same reference numerals and therefore only need to be described once in each case as a rule.

The plug-type connection of this invention consists of two coupling parts, including a socket part 2 and a plug part 4. With a plug shank 6, the plug part 4 can be inserted in a sealing manner into a locating opening 8 of the socket part 2 and can be releasably locked in the plugged-in state via a locking arrangement 10. A circumferential seal, in particular in the form of a sealing ring 12 arranged in an annular groove on the plug shank 6, is provided for the sealing.

The locking arrangement 10 consists of two outer, radial, flange-like retaining webs 14 and 16 of the two coupling parts 2, 4 on the one hand and of a retaining element 18 on the other hand. In the plugged-in state, the retaining webs 14, 16 lie axially adjacent to one another in the plug-in direction (arrow 20). With at least one retaining section 22 which is C-shaped in axial section, the retaining element 18 encloses the retaining webs 14 and 16 of the two coupling parts 2, 4 axially and radially in a positive-locking manner. This locking state is shown in FIGS. 1 and 2.

According to the invention, the retaining element 18 is captively pre-fitted or can be captively pre-fitted on one of the two coupling parts, to be precise on the plug part 4 in the preferred embodiment shown. In this case, the retaining element 18 and the plug part 4 are designed so as to be adapted to one another in such a way that the retaining element 18, on the one hand, is fixed with little play in the axial direction and captively in the radial direction and, on the other hand, is elastically movable radially in the region of each retaining section 22. Furthermore, the retaining element 18, in the region of each retaining section 22, and the retaining web 14 of the other coupling part, in the embodiment shown of the socket part 2, are designed so as to be adapted to one another for forming a positive-locking latching connection, acting in plug-in direction 20, in such a way that, when the coupling parts 2 and 4 are fitted together, each retaining section 22 is moved radially outward by the retaining web 14, moving relative thereto, and subsequently, in the plugged-in state, by moving back radially inward, encloses the retaining webs 14 and 16 of the two coupling parts 2 and 4 for the locking, as shown in FIG. 2.

For the latching according to the invention, the retaining element 18, in the region of each retaining section 22, has a latching element 24 on the side facing the other coupling part 2 during the plug-in operation. Each latching element 24 has a radially inner sloping surface 26 on its front side facing the other coupling part 2 in plug-in direction 20 and also a radial retaining edge 28 on its opposite side. The retaining web 14, moving in a relative manner during the plugging-in, produces a radially outwardly directed expansion movement of the respective latching element 24 via the sloping surface 26 until the radial retaining edge 28 of said latching element 24 subsequently engages in a latching, positive-locking manner behind the retaining web 14.

It may be noted at this point that a type of kinematic reversal is also possible by virtue of the fact that a corresponding sloping surface may also be formed on the retaining web 14 in order to radially expand the retaining sections 22.

The retaining element 18 is preferably designed as a one-piece elastic annular clip 30 which has an axially and radially continuous slot aperture 32 at a circumferential point for the radially elastic deformability. In an in particular radially symmetrical circumferential distribution, the annular clip 30 has at least two, but preferably, as shown, four retaining sections 22, which are C-shaped in axial section, so that correspondingly at least two, preferably four latching elements 24 are also provided.

For the pre-fitting of the retaining element 18, the associated coupling part, preferably the plug part 4, has a radial annular groove 34 for accommodating a corresponding radial annular collar 36 of the retaining element 18. The annular collar 36, by means of a (radial) insertion movement of the annular clip 30 directed transversely to the plug-in direction 20, can be inserted with the slot aperture 32 in front into the annular groove 34, with the annular clip 30 widening elastically. In this respect, reference is made to the illustration in FIG. 3. The radial annular groove 34, according to FIG. 4, is preferably formed axially between the retaining web 16 and an additional annular fixing web 38. In this case, the annular fixing web 38 has a diameter which is greater than the diameter of the retaining web 16. In practice, the diameter of the retaining web 16 preferably corresponds approximately to the inside diameter of the annular clip 30 in those internal surface regions of the retaining sections 22 which adjoin the annular collar 36.

Furthermore, in a maximum expanded state of the annular clip 30 during the plug-in operation, the annular collar 36 of annular clip 30 has an inside diameter which is approximately equal to or slightly larger than the diameter of the retaining web 16, but in any case smaller than the diameter of the larger annular fixing web 38. This configuration ensures reliable axial support of the annular clip 30 on the annular fixing web 38 during the plug-in operation.

The annular clip 30 extends over a circumferential angle (angle of wrap) □ (FIG. 8) which is dimensioned to be at least so large that, in the maximum expanded state during the plug-in operation, the clear open width of the slot aperture 32 is always smaller than the respectively associated diameter of the plug part 4. This ensures that the annular clip 30 encloses the plug part 4 over more than 180° in each region of its axial extent. As a result, the annular clip 30 is captively fixed on the plug part 4. However, for fitting/removal, the annular clip 30 can still be expanded or widened slightly further elastically. The fixing is therefore effected by snapping in place frictionally in the transverse direction. In the embodiment shown, the circumferential angle □ of the annular clip 30 is about 300°, so that an opening angle of about 60° is obtained in the region of the slot aperture.

In a further advantageous configuration, each retaining section 22, which is C-shaped in axial section, is formed by one of the latching elements 24, an axially opposite circumferential section of the annular collar 36 and part of the circumferential wall 40 of the annular clip 30. Furthermore, it is advantageous in this case if the circumferential wall 40 has a larger radial thickness in the region of the retaining sections 22 and a reduced thickness in the region lying in each case between the retaining sections 22. By means of this advantageous configuration, high stability for ensuring high pulling-off forces is achieved on the one hand in the region of the retaining sections 22, and good (high) radial elasticity is achieved in each case between the retaining sections 22 due to the thinner sections of the circumferential wall 40.

The retaining sections 22 and thus also the latching elements 24 are arranged in an even number (in particular four) symmetrically to a center plane 42 running axially and centrally through the slot aperture 32 of the annular clip 30 (cf. FIG. 8). As a result, on the side diametrically opposite the slot aperture 32, in the region between two retaining sections 22 or latching elements 24, a type of joint which divides the annular clip 30 into two spring arms is formed by a section of the circumferential wall 40 of smaller thickness. In addition, corresponding joints are also formed between the retaining sections 22 or latching elements 24 of each of the two spring arms. In this case, it is advantageous if the two latching elements 24 arranged adjacently on both sides of the center plane 42 on the side diametrically opposite the slot aperture 32, in their regions facing one another, have flanks 44 slanted in the radial direction. In these regions, the annular clip 30 experiences its least radial expansion; the flanks 44 reduce the friction here during the plug-in operation, and a very favorable ratio of axial and radial forces is achieved. As a result, the plug-in forces are additionally reduced.

As can also be seen from FIGS. 1 and 3 for example, in the region of clip ends separated via the slot aperture 32 of the annular clip 30 and facing one another in the circumferential direction, window-like passage openings 46 for the retaining webs 14, 16 are formed in each case axially between the annular collar 36 and the respective latching element 24. This facilitates the pre-fitting and removal of the annular clip 30.

Furthermore, the annular clip 30, in its regions adjoining the slot aperture 32, expediently has grip elements 48 for manually taking hold of the annular clip 30 in order to expand the latter when removing it radially for releasing the connection of the coupling parts 2 and 4.

Figure 11A:
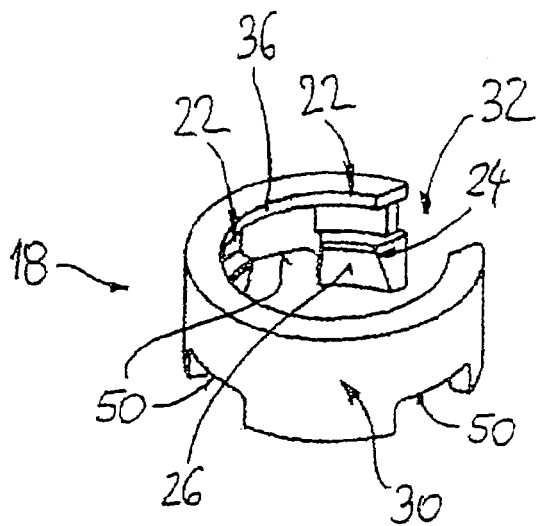
FIG. 11a-c show three embodiment variants of the retaining element, in each case in a perspective view.
Figure 11B:
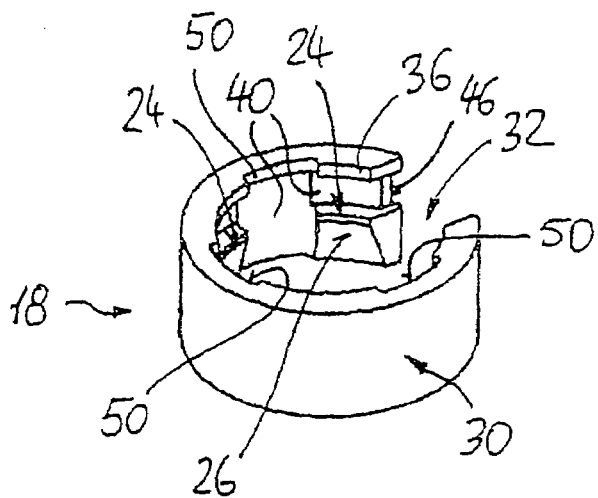
Figure 11C:
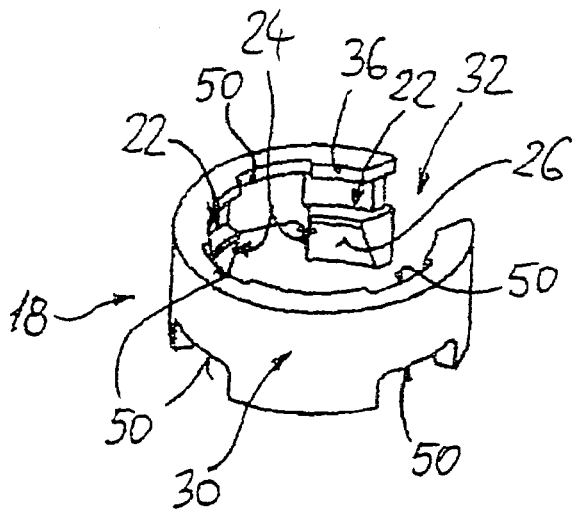

As can be seen from FIGS. 11a to 11c, the annular clip 30, for influencing its radial elasticity, may have recesses 50 in the region of the annular collar 36 and/or in regions lying circumferentially between the latching elements 24 of the retaining sections 22. Thus, according to FIG. 11a, corresponding recesses 50 are formed in the circumferential wall 40, for example, only on the one axial side between the latching elements 24, and, according to FIG. 11b, corresponding recesses 50 are formed only on the other axial side in the region of the annular collar 36. In the embodiment according to FIG. 11c, corresponding recesses 50 are arranged opposite one another on both axial sides. This embodiment ensures a low, flexible radial spring force and thus also low plug-in forces.

Figure 7:
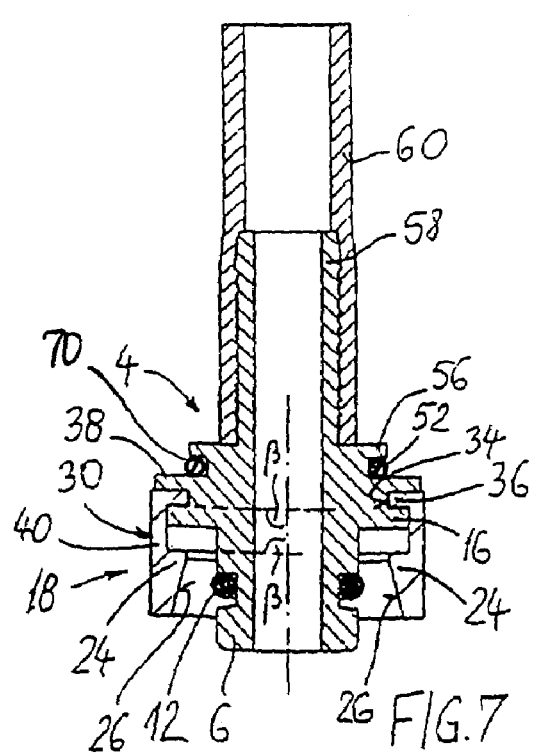
FIG. 7 shows an axial cross-section view of the one coupling part according to FIG. 6 with pre-fitted retaining element.
Figure 6:
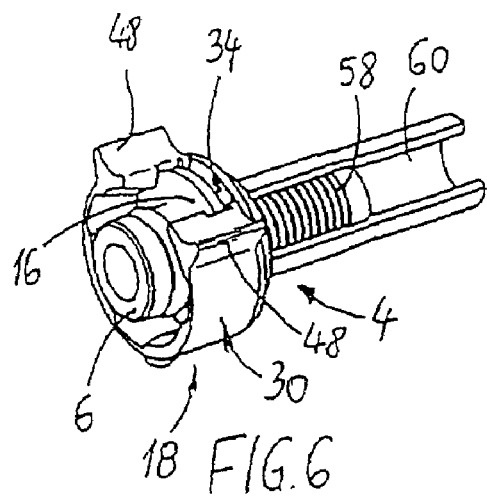
FIG. 6 shows a perspective illustration of the one coupling part with retaining element pre-fitted on it.

As already mentioned, the coupling parts 2, 4 plugged-in and locked according to FIG. 2 can be released again at any time by the retaining element 18 being removed radially. In order to also reduce the risk of loss in this released state, the retaining element 18 is preferably also captively connected to the one coupling part, here the plug part 4, via an additional securing element 70 (FIG. 7). This securing element 70 is expediently of flexible, band- or cord-like design and is expediently connected at one end to the coupling part 4 and at the other end to the retaining element 18. For connection to the coupling part 4, the securing element 70 may have an eye-like loop which is held in an additional retaining groove 52 of the coupling part 4. For connection to the retaining element 18 at the other end, a button connection is provided in the embodiment illustrated in FIGS. 8 and 9, the retaining element 18 having on its outer surface a button element 54, onto which a button-hole-like end of the securing element 70 can be buttoned. The retaining groove 52 of the coupling part 4 is preferably formed between the annular fixing web 38 and an additional annular web 56. Here, provision is preferably made for the additional annular web 56 to have a smaller diameter than the annular fixing web 38 and the retaining web 16. Due to this advantageous configuration, incorrect fitting during the pre-fitting of the retaining element 18 is largely avoided by the additional retaining groove 52 also having a smaller diameter than the annular groove 34 formed between retaining web 16 and fixing web 38.

The retaining element 18 may be made of metal, e.g. brass, in particular for use of the plug-type connection at higher hydraulic pressures. In particular for use at lower fluid pressures, the retaining element 18 may also be advantageously designed as a plastic molded part. In this case, in particular a glass-fiber-reinforced thermoplastic material is used.

The two coupling parts 2 and 4 are preferably made of metal, in particular brass.

In deviation from the embodiment shown and described, in which the retaining element 18 is pre-fitted on the plug part 4 and the annular clip 30 consequently coaxially encloses the plug shank 6 at a radial distance, provision may of course also be made for correspondingly pre-fitting the retaining element 18 on the socket part 2.

On their sides opposite the plug-type connection side, the coupling parts 2 and 4 may in principle have any desired connection elements. In the embodiment shown, the plug part 4 has a connection peg 58 for a fluid line 60 (pipe or hose). The socket part 2 has a screw union 62. Of course, at least one of the coupling parts 2 and 4 can also be formed directly (in one piece) on certain units.

Due to the described configuration according to the invention or the preferred configuration, to be precise by virtue of the fact that the annular clip 30 and the associated coupling part (plug part 4) are matched to one another in their connecting and engagement regions, pre-fitting in the correct position is always ensured; incorrect fitting is largely ruled out due to the design.

As can also be seen from FIG. 10, those retaining surfaces of the latching elements 24 and of the annular collar 36 which are axially opposite one another—and of course in adaptation thereto also the corresponding retaining surfaces of the retaining webs 14 and 16 (cf. in this respect FIG. 2)—are designed with an undercut angle $\beta \geq 90°$ in order to ensure genuine positive locking and thus high pulling-off forces.

The invention is not restricted to the exemplary embodiments shown and described but rather comprises all the embodiments having the same effect within the scope of the invention.

The invention is not restricted to the exemplary embodiment illustrated and described, but also embraces all versions having an identical effect within the meaning of the invention. Thus, all the individual features of the invention may be provided alternatively or in any desired combination.

While the above description constitutes the preferred embodiment of the present invention, it will be appreciated that the invention is susceptible to modification, variation and change without departing from the proper scope and fair meaning of the accompanying claims.

The invention claimed is:

1. A plug-type connection for fluid lines of the type having, two coupling parts including a socket part and a plug part which can be fitted together via a locking arrangement, the plug part having a plug shank insertable into a locating opening of the socket part, the locking arrangement comprising first and second outer, radial, flange-like retaining webs formed by the socket part and the plug part respectively the first and second webs being axially adjacent when the socket part and the plug part are coupled together and a retaining element forming at least one retaining section which is C-shaped in axial section and axially and radially encloses the retaining webs of the socket and plug parts, wherein the retaining element is captively pre-fitted on the one of the coupling parts such that it is axially and radially fixed and is elastically movable radially in the region of the retaining section, the retaining element, in the region of the retaining section, and the retaining web of the other of the coupling parts forming a positive-locking latching connection when the socket part and the plug part are coupled together as the parts are connected together by pushing them together in a plug in direction along the longitudinal axes of the parts.

2. The plug-type connection as claimed in claim 1, wherein the retaining element, in the region of the retaining section, has a latching element on the side facing one of the coupling parts during the plug-in operation, the latching element having a radially inner sloping surface which, due to the retaining web, moving in a relative manner during the plugging-in, produces a radially outwardly directed expansion movement of the latching element, a radial retaining edge of the retaining element engaging in a latching, positive-locking manner behind the retaining web.

3. The plug-type connection as claimed in claim 1, wherein the retaining element is designed as a one-piece elastic annular clip which has an axially and radially continuous slot aperture at a circumferential point for the radially elastic deformability and which, in a symmetrical circumferential distribution, has at least two, retaining sections which are C-shaped in axial section.

4. The plug-type connection as claimed in claim 3, wherein the annular clip extends over a circumferential angle (a) which is dimensioned to be at least so large that, in the maximum expanded state during the plug-in operation, the open width of the slot aperture is smaller than the respectively associated diameter of the one of the coupling parts.

5. The plug-type connection as claimed in claim 3, wherein the retaining section, which is C-shaped in axial section, of the retaining element is formed by one of the latching elements and an axially opposite circumferential section of the annular collar and also part of the circumferential wall of the annular clip.

6. The plug-type connection according to claim 3, wherein the latching elements are arranged in an even number symmetrically to a center plane running axially and centrally through the slot aperture of the annular clip, two latching elements arranged adjacently on both sides of the center plane on the side diametrically opposite the slot aperture, in their regions facing one another, having flanks slanted in the radial direction.

7. The plug-type connection according to claim 3, wherein, in the region of clip ends separated via the slot aperture of the annular clip and facing one another in the circumferential direction, passage openings for the retaining webs are formed in each case axially between the annular collar and the respective latching element.

8. The plug-type connection as claimed in claim 3, wherein the annular clip, in its regions adjoining the slot aperture, has grip elements for manually taking hold of the annular clip for releasing the connection of the coupling parts.

9. The plug-type connection as claimed in claim 3, wherein the annular clip has recesses in the region of the annular collar in regions lying between the latching elements.

10. The plug-type connection as claimed in claim 1, wherein one of the coupling parts, for the pre-fitting of the retaining element, has a radial annular groove for accommodating a corresponding radial annular collar of the retaining element, the annular collar being insertable into the annular groove by means an insertion movement directed transversely to the plug-in direction and with the retaining element widening elastically.

11. The plug-type connection as claimed in claim 10, wherein the radial annular groove of the one of the coupling parts is formed axially between the retaining web and an additional annular fixing web.

12. The plug-type connection as claimed in claim 11, wherein the annular fixing web has a diameter which is greater than the diameter of the retaining web.

13. The plug-type connection as claimed in claim 12, wherein the diameter of the retaining web corresponds approximately to the inside diameter of the annular clip in an internal surface region, adjoining the annular collar, of each of the retaining sections.

14. The plug-type connection as claimed in claim 11, wherein, in a maximum expanded state of the annular clip during the plug-in operation, the annular collar of said annular clip has an inside diameter which is approximately equal to the diameter of the retaining web, but in any case smaller than the diameter of the annular fixing webs.

15. The plug-type connection as claimed in claim 1, wherein the retaining element is captively connected to the one coupling part via an additional securing element.

16. The plug-type connection as claimed in claim 15, wherein the securing element is of flexible, band- or cord-like design and is connected at one end, by means of an eye loop, in an additional retaining groove of the one coupling part and is connected at the other end to the retaining element preferably via a button connection.

17. The plug-type connection as claimed in claim 16, wherein the retaining groove is formed between the annular fixing web and an additional annular web, the additional annular web preferably having a smaller diameter than the annular fixing web and the retaining web.

18. The plug-type connection as claimed in claim 1, for use at higher hydraulic pressures, wherein the retaining element is made of metal.

19. The plug-type connection as claimed in claim 1, for use at lower fluid pressures, wherein the retaining element is designed as a plastic molded part.

20. The plug-type connection as claimed in claim 19, wherein the latching elements are made of metal and are embedded, in particular encapsulated, in the plastic molded part.

21. The plug-type connection as claimed in claim 1, wherein the retaining element is pre-fitted on the plug part.

22. The plug-type connection as claimed in claim 1, wherein the coupling parts are made of metal.

23. The plug-type connection as claimed in claim 1, wherein the plug shank is capable of being inserted in a sealing manner into the locating opening of the socket part and releasably locked in the plugged-in state via the locking arrangement.

24. The plug-type connection as claimed in claim 1, wherein the retaining element includes an elastic annular clip having an axially and radially continuous slot aperture, the slot aperture having an opening angle of about 60°.

* * * * *